US010622924B2

(12) United States Patent
Niedrist

(10) Patent No.: US 10,622,924 B2
(45) Date of Patent: Apr. 14, 2020

(54) ARRANGEMENT WITH A SYNCHRONOUS GENERATOR AND AN ASYNCHRONOUS MACHINE

(71) Applicant: INNIO Jenbacher GmbH & Co OG, Jenbach Osterreich (AT)

(72) Inventor: Helmut Niedrist, Barcelona (ES)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 32 days.

(21) Appl. No.: 15/737,759

(22) PCT Filed: Jun. 30, 2016

(86) PCT No.: PCT/AT2016/050238
§ 371 (c)(1),
(2) Date: Mar. 23, 2018

(87) PCT Pub. No.: WO2017/004644
PCT Pub. Date: Jan. 12, 2017

(65) Prior Publication Data
US 2018/0254726 A1 Sep. 6, 2018

(30) Foreign Application Priority Data
Jul. 7, 2015 (AT) .................................. A 442/2015

(51) Int. Cl.
*H02P 9/08* (2006.01)
*F02N 11/04* (2006.01)
(Continued)

(52) U.S. Cl.
CPC .............. *H02P 9/08* (2013.01); *F02B 63/042* (2013.01); *F02N 11/04* (2013.01); *H02K 7/1815* (2013.01);
(Continued)

(58) Field of Classification Search
CPC .... F02N 11/04; H02P 9/00; H02P 9/08; F02B 63/042
See application file for complete search history.

(56) References Cited

U.S. PATENT DOCUMENTS 3,667,014 A * 5/1972 Merhof ..................... H02P 1/46
318/715
3,798,522 A 3/1974 Pisecker et al.
(Continued)

FOREIGN PATENT DOCUMENTS

DE 880764 C 6/1953
DE 2 235 058 A1 1/1974
(Continued)

OTHER PUBLICATIONS

Office Action and Search issued in connection with corresponding AT Application No. A442/2015 dated Jul. 13, 2016.
(Continued)

*Primary Examiner* — Sean Gugger
(74) *Attorney, Agent, or Firm* — Fletcher Yoder, P.C.

(57) ABSTRACT

An arrangement with a synchronous generator for the conversion of mechanical power into electrical power, with a predetermined number of pole pairs, an asynchronous machine, with a pronounced rotor winding, which is mechanically coupled to a rotor of the synchronous generator and has a number of pole pairs at least 1 greater than the synchronous generator.

20 Claims, 2 Drawing Sheets

(51) Int. Cl.
*H02K 7/18* (2006.01)
*H02P 9/00* (2006.01)
*F02B 63/04* (2006.01)

(52) U.S. Cl.
CPC ............... *H02P 9/00* (2013.01); *F02B 63/04* (2013.01); *F02N 2200/022* (2013.01); *H02P 2207/03* (2013.01)

(56) References Cited

U.S. PATENT DOCUMENTS

| | | | | |
|---|---|---|---|---|
| 5,345,125 | A * | 9/1994 | Raad | H02K 19/14 307/87 |
| 6,239,513 | B1 * | 5/2001 | Dean | H02J 9/066 307/64 |
| 7,576,508 | B2 * | 8/2009 | Xu | H02K 19/36 318/541 |
| 2003/0038483 | A1 * | 2/2003 | Klaar | F02C 7/268 290/52 |
| 2004/0027078 | A1 * | 2/2004 | Xu | F02C 7/268 318/107 |
| 2006/0181251 | A1 * | 8/2006 | Velhner | F02N 11/04 322/59 |
| 2007/0194572 | A1 * | 8/2007 | Xu | H02K 19/12 290/31 |
| 2008/0067984 | A1 * | 3/2008 | Anghel | F01D 15/10 322/52 |
| 2010/0164428 | A1 * | 7/2010 | Xu | F01D 15/10 318/767 |
| 2012/0268082 | A1 * | 10/2012 | Krause | H02P 9/12 322/59 |
| 2013/0193903 | A1 * | 8/2013 | Illiano | H02P 9/123 318/716 |
| 2014/0042818 | A1 * | 2/2014 | Blacha | H02J 3/24 307/77 |
| 2016/0094114 | A1 * | 3/2016 | Gao | H02K 19/12 310/68 D |

FOREIGN PATENT DOCUMENTS

| | | |
|---|---|---|
| EP | 1 289 118 A1 | 3/2003 |
| EP | 2 696 464 A1 | 2/2014 |
| RO | 129273 | 2/2014 |

OTHER PUBLICATIONS

Machine Translation and International Search Report and Written Opinion issued in connection with corresponding PCT Application No. PCT/AT2016/050238 dated Sep. 23, 2016.

Machine Translation and International Preliminary Report on Patentability issued in connection with corresponding PCT Application No. PCT/AT2016/050238 dated Jan. 9, 2018.

* cited by examiner

ARRANGEMENT WITH A SYNCHRONOUS GENERATOR AND AN ASYNCHRONOUS MACHINE

TECHNOLOGY FIELD

The invention relates to an arrangement with a synchronous generator and a genset and a method for operating a genset.

BACKGROUND

For decentralized power generation, so-called gensets are often used, which are internal combustion engines coupled to a generator (usually a synchronous generator). For this application, common internal combustion engines can achieve powers of up to 10 MW (megawatts) or even higher and have corresponding dimensions.

In operation, these internal combustion engines run at a predetermined speed of the mains frequency, for example 1000 revolutions per minute at 50 Hz mains frequency and with a number of pole pairs of 3.

Usually, the excitation power of the synchronous machine required at the rotor is transmitted to the rotor via a brushless auxiliary machine.

For the general background, reference is made, for example, to DE2235058 (A1), which shows an arrangement for the excitation of an asynchronously starting synchronous machine.

To overcome the heavy starting torques, starting such internal combustion engines requires high-power starters. For internal combustion engines over 5 MW, as a rule pneumatic starters, mostly electric starters, are used. In particular, pneumatic starters are very expensive and require a lot of space.

Therefore, both for the excitement of the synchronous generator and for starting the internal combustion engine, expensive additional equipment is required.

BRIEF SUMMARY

The object of this invention is to specify an arrangement with a synchronous generator, a genset or a method for operating a genset, which resolves the disadvantages of the prior art.

These objects are achieved by an arrangement according to claim 1, a genset according to claim 7 or a method according to claim 9. Advantageous embodiments are indicated in the dependent claims.

By an arrangement with a synchronous generator for converting mechanical power into electrical power, with a predetermined number of pole pairs an asynchronous machine with a pronounced rotor winding, which is mechanically coupled to a rotor of the synchronous generator and which has a number of pole pairs at least 1 larger than the synchronous generator, it is achieved that the asynchronous machine, at a predetermined speed of the synchronous generator compared to the synchronous generator, runs over-synchronously and thus itself acts as a generator, i.e. an asynchronous machine is used simultaneously as an excitation machine of the synchronous generator and as a starter motor.

Illustrated by a numerical example, this means that, in the case of a number of pole pairs of the synchronous generator of 3, the asynchronous machine has, for example, a number of pole pairs of 4, i.e. it has 8 poles.

"Pronounced rotor winding" means that it is a wound coil and not a squirrel-cage rotor.

More particularily, the asynchronous machine is substantially designed smaller with respect to the electrical power, for example by a factor of 100, than the synchronous generator.

At a speed of the synchronous generator considered as given, for example 1,000 rpm, the asynchronous machine runs with constant slip due to the higher number of pole pairs, and therefore in generator mode. Slip is usually abbreviated as "s", where negative slip refers to generator mode. The operating state is accordingly s<0.

This opens up the possibility of using the asynchronous machine to supply the excitation winding of the synchronous generator with electrical power via the rotor.

Different variants are possible for controlling the excitation voltage of the synchronous generator generated by the asynchronous machine:

Thus, it can be provided that at least one controlled, rotating rectifier unit is arranged on the rotor of the asynchronous machine, designed as a rotating thyristor set. The control signal of the thyristor set can be transmitted, for example, wirelessly by means of known systems to the rotor.

Thus, from the induced rotor voltage of the asynchronous machine, a variable excitation voltage for the synchronous generator can be generated. In this way, the excitation field of the synchronous generator can be controlled specifically.

According to another variant, it can be provided that at least one uncontrolled rectifier is arranged on the rotor of the asynchronous machine.

In this way, the excitation voltage of the synchronous generator can be controlled by variation of the stator voltage of the asynchronous machine, for example via a static thyristor set.

A particularly advantageous feature of the arrangement is that an asynchronous machine designed in this way can also be used to crank the synchronous generator or, if the synchronous generator is connected to a prime mover, e.g. a reciprocating piston engine (internal combustion engine), it can also be used to start the prime mover. In this case, the asynchronous machine is operated in a conventional manner as an electric motor. Expressed as slip, the operating state is then 0<s<1.

The asynchronous machine must be dimensioned for the torque applied for cranking the synchronous generator and for starting the prime mover.

In this way, the asynchronous machine can be used as an excitation machine for the synchronous generator and at the same time as a starter motor for the prime mover. Additional starting devices and excitation machines can be dispensed with.

Another advantage of the arrangement is that the rotational speed of the arrangement could be increased approximately to slip s=0 when using the asynchronous machine in motor mode, i.e. almost 750 rpm in the mentioned numerical example. Thus, significantly higher starting speeds than conventional starter motors can be achieved, making a coupled reciprocating piston engine easier to start. Conventional starter motors usually reach much lower speeds.

It is provided that the prime mover is a reciprocating piston engine, particularly a stationary gas engine. The invention is particularly suitable for use in stationary internal combustion engines, in particular gas engines, especially internal combustion engines which are coupled with a synchronous generator to a genset for decentralized power supply.

BRIEF DESCRIPTION OF THE DRAWINGS

The invention is explained in more detail with reference to the following figures.

DETAILED DESCRIPTION

Figure 1:
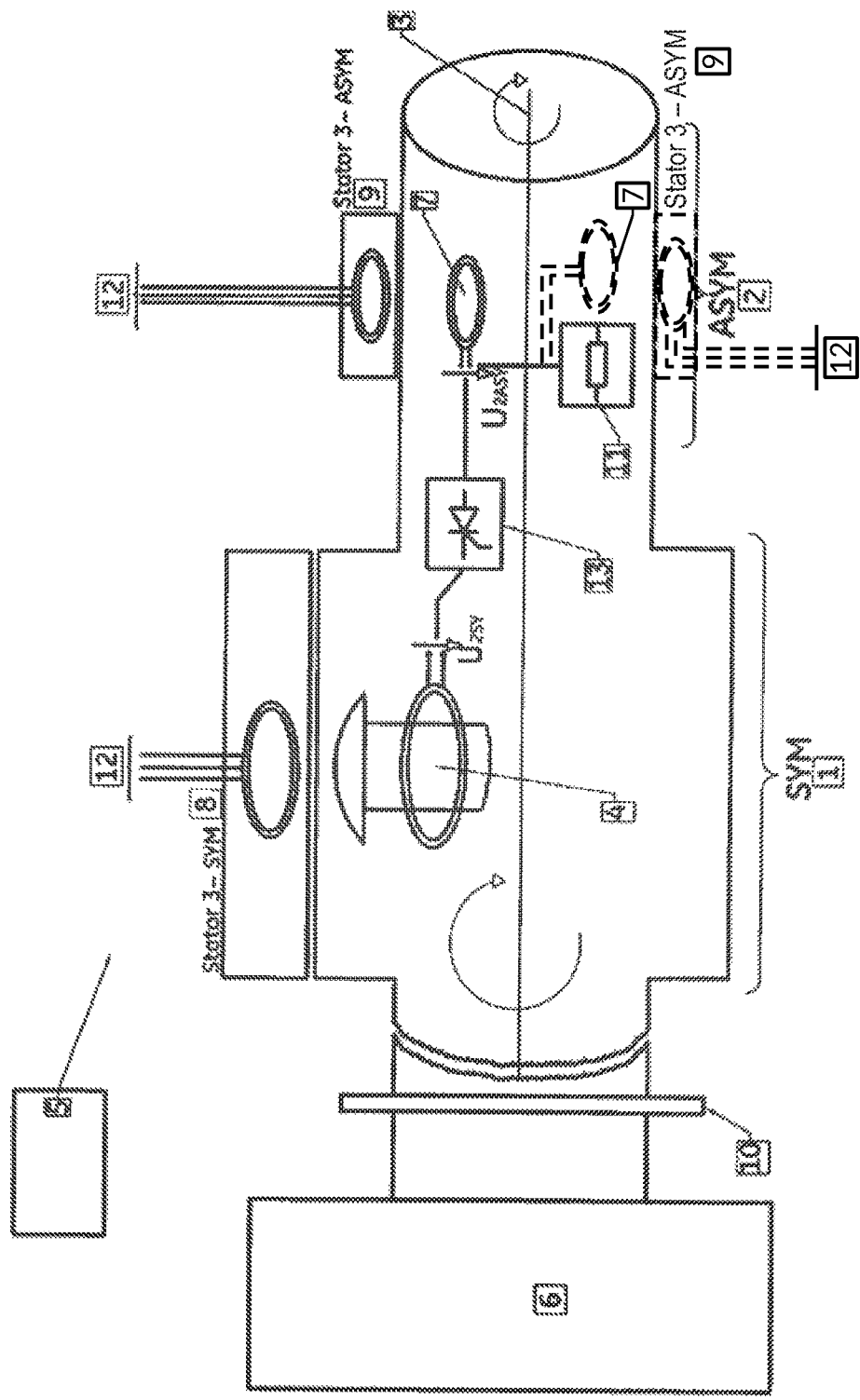
FIGS. 1 and 2 show arrangements of a synchronous generator and an asynchronous machine in two variants, which differ with regard to the voltage regulation. The explanations of FIG. 1 apply to FIG. 2 and vice versa.

They show a synchronous generator 1 and an asynchronous machine 2 with much smaller power, which are arranged on a common rotor 3.

Also indicated is a prime mover 6, which can be connected to the rotor 3 designed as a shaft. The excitation winding 4 of the rotor of the synchronous machine 1 and the rotor winding 7 of the asynchronous machine 2 are also shown.

In both exemplary embodiments, the synchronous generator 1 has three pole pairs and the asynchronous machine 2 has four pole pairs. For example, a prime mover 6, such as a reciprocating piston engine, can be coupled via a mechanical coupling 10 to the rotor 3 designed as a shaft. The rotor winding 7 of the asynchronous machine 2 is electrically connected to the excitation winding 4 of the synchronous generator 1, depending on the variant via a controlled rectifier 13 (FIG. 1) or an uncontrolled rectifier 14 (FIG. 2).

For the motorized operation of the asynchronous machine 2, i.e. during a start process (the asynchronous machine 2 acts as a starter motor), the rotor winding 7 is optionally acted on by an adjustable impedance 11 in order to increase the tightening torque. A control device 5 can be connected via control lines (not shown) to the windings 4, 7, 8, 9, the impedance 11, the prime mover 6 (if present) and the rotor 3, by means of contactless transmission to the rotor.

In the variant shown in FIG. 1, the voltage regulation of the excitation voltage $U_{2SY}$ of the synchronous generator 1 is performed via a controlled, rotating rectifier unit 13, by means of a controlled, rotating thyristor set.

Figure 2:
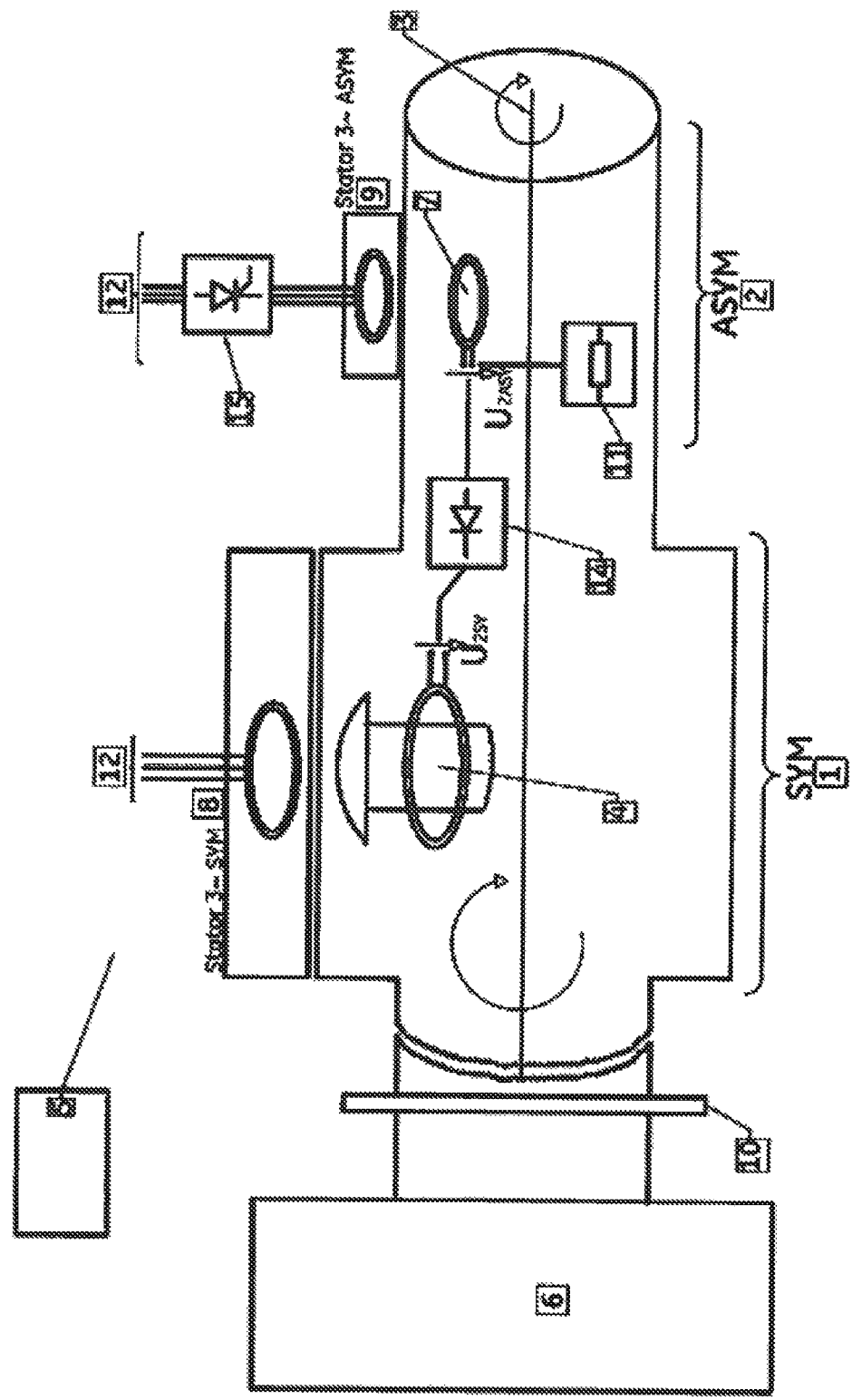

In the variant according to FIG. 2, the voltage regulation of the excitation voltage $U_{2SY}$ of the synchronous generator 1 is performed via an uncontrolled, rotating rectifier unit 14, a diode rectifier, and a static voltage regulation 15 of the asynchronous machine 2, by means of a static thyristor set.

To illustrate the power relationships between the synchronous generator 1 and the asynchronous machine 2, numerical values for the nominal powers are given by way of example: the nominal power of the synchronous generator 1 may be e.g. 12 MVA (megavolt-amperes) and the nominal power of the asynchronous machine 2 may be approx. 50 kVA (kilovolt-amperes).

There follows an explanation of the function of the asynchronous machine 2 as an excitation machine for the synchronous generator 1, i.e. the function of the asynchronous machine 2 in generator mode. The following numerical example is of course also applicable to other exemplary embodiments than those shown in FIGS. 1 and 2. First, the slip s of the asynchronous machine 2 is determined. The asynchronous machine 2 has a nominal speed $n_N$ of 750 rpm, and the operating speed n of the synchronous generator 1 is 1,000 rpm. Then, the slip s of the asynchronous machine 2 is calculated as follows:

$$s=(n_N-n)/n_N=(750-1000)/750=-0.3333$$

This results in a power $P_2$ present in the rotor of:

$$P_2=s*P_1=s/(1-s)*P_m=-0,25*P_m$$

where $P_m$ is the mechanical drive power of the shaft (rotor 3).

This power $P_2$ can be tapped to the rotor 3 with the frequency $f_2$ $$f_2=s*f_1=-0.3333*50=-16.66 \text{ Hz}$$

The rotor voltage of the asynchronous machine 2 $U_{2ASY}$ is therefore at the frequency f2=16.66 Hz. Depending on the embodiment variant, this voltage is rectified by means of controlled or uncontrolled rotating rectifiers and serves as the excitation voltage $U_{2SY}$ of the synchronous machine.

In the stator of the asynchronous machine 2, the following power $P_1$ results, which can be fed into the mains, after deducting the losses:

$$P_1=P_m/(1-s)=0.75*P_m$$

There follows an explanation of the function of the asynchronous machine 2 in motor mode:

By connecting the stationary asynchronous machine 2 to a three-phase system 12, it can be operated as an electric motor. Due to the pronounced rotor winding 7 of the asynchronous machine 2, the starting current will be lower than in a squirrel-cage rotor, and the starting torque will be greater.

In addition, to improve the starting behavior (i.e. during motor mode of the asynchronous machine 2, i.e. at undersynchronous speeds) on the rotor winding 7 of the asynchronous machine 2, an auxiliary impedance 11 is switched instead of the excitation winding 4, as indicated in FIG. 1 and FIG. 2. In this way, the starting torque can be optimized. The design of the auxiliary impedance 11 depends on the electrical and mechanical parameters of the arrangement.

If the asynchronous machine 2 is now supplied with power from the mains 12, the asynchronous machine 2 accelerates the arrangement to a speed close to the nominal speed $n_{NASYM}$ of the asynchronous machine 2 (approx. 750 rpm in the mentioned example).

This speed is much higher than in conventional starter systems, which has an advantageous effect on the start of a reciprocating piston engine.

If an internal combustion engine 6 is still provided in the arrangement, it can now further accelerate the arrangement of the synchronous generator 1, asynchronous machine 2 and prime mover 6 to a nominal speed of the synchronous generator 1 (1,000 rpm in the example mentioned), as a result of which the asynchronous machine 2 steplessly passes into the generator mode described above.

For the regulation of the excitation voltage of the synchronous generator 1, there are two variants:

In a first variant, as shown in FIG. 1, a controlled, rotating rectifier unit 13, a thyristor control set, creates a variable excitation voltage $U_{2SY}$ of the synchronous generator 1.

More particularily, the rectifier unit 13 is designed as a controlled, rotating thyristor control set that allows a particularly fast control of the excitation voltage $U_{2SY}$ of the synchronous generator 1, and also can be switched on and off without delays.

FIG. 2 shows an arrangement of a synchronous generator 1 and an asynchronous machine 2 according to the second variant:

Here, the voltage regulation of the excitation voltage $U_{2SY}$ of the synchronous generator 1 is performed by varying the stator voltage of the asynchronous machine 2, by a static thyristor control set 15 in the stator of the asynchronous machine 2 and via an uncontrolled rectifier 14 in the rotor 3. As a result, the induced rotor voltage $U_{2ASY}$ is changed, and thus, via the rectifier 14, the excitation voltage $U_{2SY}$ is changed.

This arrangement allows a regulation of the excitation voltage $U_{2SY}$ of the synchronous generator 1, for which no control signals are required in the rotor 3. In addition, the thyristor control set 15 can also be used for a soft start of the asynchronous machine 2 when starting the prime mover 6.

The advantages of this variant are the simpler and more favorable control than with controlled thyristors in the rotor and the possibility of a soft start of the asynchronous machine 2 in start mode. A disadvantage is the longer control times of the excitation voltage of the synchronous generator.

The invention claimed is:

1. A genset arrangement with:
    a synchronous generator configured to convert mechanical power into electrical power, with a predetermined number of pole pairs; and
    an asynchronous machine with a pronounced rotor winding, wherein the asynchronous machine is mechanically coupled to a rotor of the synchronous generator and has a number of pole pairs at least 1 larger than the synchronous generator, wherein the asynchronous machine comprises an adjustable impedance located on the rotor configured to adjust a torque for the arrangement by:
        adjusting a starting torque and directing voltage through the adjustable impedance instead of powering an excitation winding of the asynchronous generator during start up of the genset arrangement; and
        after the start up, diverting voltage from the adjustable impedance to the excitation winding.

2. The arrangement of claim 1, whereby at least one rotor winding of a rotor of the asynchronous machine is electrically coupled with at least one excitation winding of the rotor of the synchronous generator.

3. The arrangement of claim 2, whereby a control device for controlling or regulating a voltage applied by the electrical coupling in the at least one excitation winding of the rotor of the synchronous generator is provided.

4. The arrangement of claim 2, whereby at least one controlled, rotating rectifier unit is arranged on the rotor of the asynchronous machine.

5. The arrangement of claim 2, whereby at least one uncontrolled, rotating rectifier is arranged on the rotor of the asynchronous machine.

6. The arrangement of claim 1, whereby the synchronous generator is mechanically coupled with a prime mover to the genset.

7. The arrangement of claim 1, comprising a prime mover, wherein the asynchronous machine is configured to start the prime mover during a start up of the prime mover.

8. The arrangement of claim 7, wherein, after reaching a predetermined speed of the prime mover is achieved after the start up of the prime mover, the asynchronous machine is configured to act as a generator configured to generate an excitation voltage of the synchronous generator.

9. The arrangement of claim 1, wherein the asynchronous machine comprises a thyristor to rectify a rotor voltage of the asynchronous machine to generate an excitation voltage for the synchronous generator.

10. A genset system comprising:
    a synchronous generator configured to convert mechanical power into electrical power, with a predetermined number of pole pairs; and
    an asynchronous machine with a pronounced rotor winding, wherein the asynchronous machine is mechanically coupled to a rotor of the synchronous generator and has a number of pole pairs at least 1 larger than the synchronous generator, and wherein the asynchronous machine comprises an adjustable impedance located on the rotor configured to adjust a torque for the genset system using the adjustable impedance by:
        adjusting a starting torque and directing voltage through the adjustable impedance instead of powering an excitation winding of the asynchronous generator during start up of the genset system; and
        after the start up, diverting voltage from the adjustable impedance to the excitation winding; and
    a prime mover whereby the asynchronous machine is configured to be used as a starting device for the prime mover.

11. The genset system of claim 10, whereby the asynchronous machine is configured to, after exceeding a predetermined speed of the prime mover, to act as a generator for generating an excitation voltage of the synchronous generator.

12. The genset system of claim 10, wherein at least one rotor winding of the asynchronous machine is electrically coupled with at least one excitation winding of the synchronous generator.

13. The genset system of claim 12, comprising a control device configured to regulate a voltage applied by an electrical coupling between the at least one excitation winding and the at least one rotor winding.

14. The genset system of claim 12, whereby at least one controlled, rotating rectifier unit is arranged on the rotor.

15. The genset system of claim 14, wherein the at least one controlled, rotating rectifier unit comprises a thyristor.

16. The genset system of claim 12, wherein at least one uncontrolled, rotating rectifier is arranged on the rotor of the asynchronous machine.

17. The genset system of claim 16, wherein the at least one uncontrolled, rotating rectifier comprises a diode.

18. The genset system of claim 12, comprising a static voltage regulator configured to regulate a voltage of the at least one rotor winding of the asynchronous machine.

19. The genset system of claim 18, wherein the static voltage regulator comprises a thyristor.

20. A method for operating a genset system, comprising:
    using an asynchronous machine having a pronounced rotor winding to start a prime mover as a starter motor using a rotor coupled to the asynchronous machine and to the prime mover;
    after exceeding a predetermined speed of the prime mover, using the asynchronous machine as a generator to generate an excitation voltage;
    adjusting an impedance of an adjustable impedance located on the rotor of the asynchronous machine to adjust a torque for the genset system using the adjustable impedance by:
        adjusting a starting torque and directing voltage through the adjustable impedance instead of powering an excitation winding of the asynchronous generator during start up of the genset system; and
        after the start up, diverting voltage from the adjustable impedance to the excitation winding; and
    converting mechanical power into electrical power using a synchronous generator coupled to the rotor having a predetermined number of pole pairs, wherein the asynchronous machine has a number of pole pairs at least 1 larger than the predetermined number of the pole pairs of the synchronous generator.

* * * * *